(12) United States Patent
Estlick et al.

(10) Patent No.: US 9,959,122 B2
(45) Date of Patent: May 1, 2018

(54) SINGLE CYCLE INSTRUCTION PIPELINE SCHEDULING

(71) Applicant: Advanced Micro Devices, Inc., Sunnyvale, CA (US)

(72) Inventors: Michael D. Estlick, Fort Collins, CO (US); Jay E. Fleischman, Fort Collins, CO (US); Kevin A. Hurd, Fort Collins, CO (US); Mark M. Gibson, Timnath, CO (US); Kelvin D. Goveas, Austin, TX (US); Brian M. Lay, Boulder, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1237 days.

(21) Appl. No.: 13/869,488

(22) Filed: Apr. 24, 2013

(65) Prior Publication Data

US 2014/0325187 A1 Oct. 30, 2014

(51) Int. Cl.
*G06F 15/00* (2006.01)
*G06F 9/46* (2006.01)
*G06F 9/38* (2018.01)

(52) U.S. Cl.
CPC .......... *G06F 9/3828* (2013.01); *G06F 9/3836* (2013.01); *G06F 9/3838* (2013.01); *G06F 9/3873* (2013.01); *G06F 9/3889* (2013.01)

(58) Field of Classification Search
CPC .................. G06F 9/4881; H04L 2209/125
See application file for complete search history.

(56) References Cited

U.S. PATENT DOCUMENTS

| | | | | |
|---|---|---|---|---|
| 2008/0184361 A1* | 7/2008 | Thekkath | ............... | G06F 21/71 726/17 |
| 2009/0276587 A1* | 11/2009 | Moyer | ............... | G06F 11/1044 711/155 |
| 2010/0332804 A1* | 12/2010 | Golla | ................... | G06F 9/3838 712/214 |
| 2011/0078697 A1* | 3/2011 | Smittle | ................ | G06F 9/3836 718/104 |
| 2013/0046957 A1* | 2/2013 | Tran | .................... | G06F 9/30087 712/208 |
| 2014/0101414 A1* | 4/2014 | Hurd | ....................... | G06F 9/30 712/208 |

* cited by examiner

*Primary Examiner* — Hyun Nam (57) ABSTRACT

A method includes allocating a first single-cycle instruction to a first pipeline that picks single-cycle instructions for execution in program order. The method further includes marking at least one source register of the first single-cycle instruction as ready for execution in the first pipeline in response to all older single-cycle instructions allocated to the first pipeline being ready and eligible to be picked for execution. An apparatus includes a decoder to decode a first single-cycle instruction and to allocate the first single-cycle instruction to a first pipeline. The apparatus further includes a scheduler to pick single-cycle instructions for execution by the first pipeline in program order and to mark at least one source register of the first single-cycle instruction as ready for execution in the first pipeline in response to determining that all older single-cycle instructions allocated to the first pipeline are ready and eligible.

20 Claims, 8 Drawing Sheets

SINGLE CYCLE INSTRUCTION PIPELINE SCHEDULING

BACKGROUND

Field of the Disclosure

The present disclosure relates generally to processing systems and, more particularly, to single-cycle scheduling of instruction pipelines in processing systems.

Description of the Related Art

Processing systems, such as central processing units (CPUs), graphical processing units (CPUs), and accelerated processing units (APUs), implement instruction pipelines to increase executed instruction throughput. A typical instruction pipeline includes several pipeline stages, such as an instruction fetch stage, a decode stage, an execution stage, a memory access stage, and a write-back stage. Instruction schedulers can be used to improve the overall pipeline throughput by optimizing the order or schedule of execution of instructions. For example, out-of-order instruction scheduling can be used to schedule instructions for execution in the pipeline in an order that is different than the program order of the instructions. However, out-of-order instruction schedulers must account for potential data hazards related to dependencies between the different instructions. For example, a first instruction that writes a value to a register that is later read by a second instruction generally should be executed before the second instruction.

Conventional instruction schedulers can be configured to operate with single-cycle latency or multi-cycle latency, wherein the "latency" represents the time required to pick an instruction and then broadcast identifiers of the one or more destination registers for the picked instruction to other entries in the scheduler. Thus, pipelines that operate with multi-cycle latency typically require two or more cycles to pick an instruction and then broadcast identifiers of the one or more destination registers for the picked instruction. As such, dependent instructions have to wait two or more cycles after their parent instruction has been picked for execution before they can determine whether they are ready to be picked for execution by the pipeline. For example, a multi-cycle scheduler may be implemented using an instruction pipeline that includes a first stage for determining whether the source registers of instructions in entries of the scheduler are ready and eligible for execution, a second stage for picking the oldest ready and eligible instructions for execution, and a third stage for broadcasting identifiers of the destination registers of the picked instructions. The broadcast destination identifiers are then compared to the source registers of other entries in the scheduler (in the first stage of the pipeline) to determine whether these entries are ready and eligible for execution.

Pipelines that operate with single-cycle latency can pick an instruction and broadcast the destination register information in a single cycle. As such, dependent instructions only wait a single cycle before they can determine whether they can be picked for execution by the pipeline. For example, latency of an instruction scheduler can be reduced to one cycle by picking the oldest ready and eligible instruction and broadcasting identifiers of its destination registers in a single stage. However, requiring the pick and broadcast functions to be performed in a single cycle limits the number of instructions that can be held in the scheduler queue because timing constraints limit the number of entries in the scheduler queue that can receive broadcast values of the identifiers in a single cycle. Furthermore, not all instructions have a latency that is short enough to complete in a single cycle. For example, floating-point instructions such as division may take multiple cycles to execute and provide results to their destination registers. Longer latency instructions may therefore require a multi-cycle latency pipelines.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As discussed herein, timing constraints limit the number of instructions that can be held in a scheduler queue for a single-cycle pipeline. At least in part to address these drawbacks in the conventional practice, disclosed are embodiments of a processor implementing a single-cycle pipeline that schedules dependent instructions in program order. Source registers that depend on one or more older single-cycle instructions can be marked as ready to be picked for execution by the single-cycle pipeline as soon as all older single-cycle instructions in the single-cycle pipeline are marked as ready and eligible to be picked for execution. The single-cycle pipeline processes instructions in program order and consequently source registers of the dependent instructions are guaranteed to receive data from their parent instructions before this data is needed. Marking the source registers as ready as soon as the older single-cycle instructions have been picked for execution eliminates the need to broadcast information identifying the destination registers for instructions that are picked for execution in the single-cycle pipeline and consequently relieves the timing constraints that may limit the number of instructions held in the scheduler queue. As used herein, the term "ready", when referring to an instruction, indicates that all the source registers of the instruction are available for access by the instruction and are not waiting for another instruction to produce results for any of these registers. The term "eligible", when referring to an instruction, indicates that there are no pipeline hazards that would prevent the instruction from starting. For example, the register file write port needs to be available at the correct time, otherwise an unavailable register file report may prevent the instruction from starting and therefore be a pipeline hazard. Some embodiments may achieve the advantages of both single-cycle pipelines and multi-cycle pipelines by implementing a set of pipelines that includes both single-cycle pipelines and multi-cycle pipelines and scheduling instructions that have longer latencies to the multi-cycle pipelines.

Embodiments of the processing systems described herein include an instruction scheduler for scheduling instructions for one set of instruction pipelines that implements multi-cycle latency and another set of instruction pipelines that can support either multi-cycle latency or single-cycle latency. The instruction scheduler includes a plurality of entries used to store single-cycle instructions and multi-cycle instructions. The single-cycle instructions are allocated to one of the instruction pipelines that supports single-cycle latency and the single-cycle operations may be stored in program order. Single-cycle instructions that reference source registers that are dependent upon one or more older single-cycle instructions are assigned to the same pipeline as the older single-cycle instructions. The instruction scheduler can mark one or more source registers of the single-cycle instructions as ready for execution by the pipeline in response to determining that all older single-cycle instructions in the pipeline are ready and eligible for execution by the pipeline. The instruction scheduler then selects ready single-cycle instructions in program order for execution with single-cycle latency in the pipeline. Since the single-cycle instructions are picked in program order, older single-cycle instructions complete before younger single-cycle instructions that may be dependent upon the older single-cycle instructions, and thus avoiding hazards due to inter-instruction dependencies.

Figure 1:
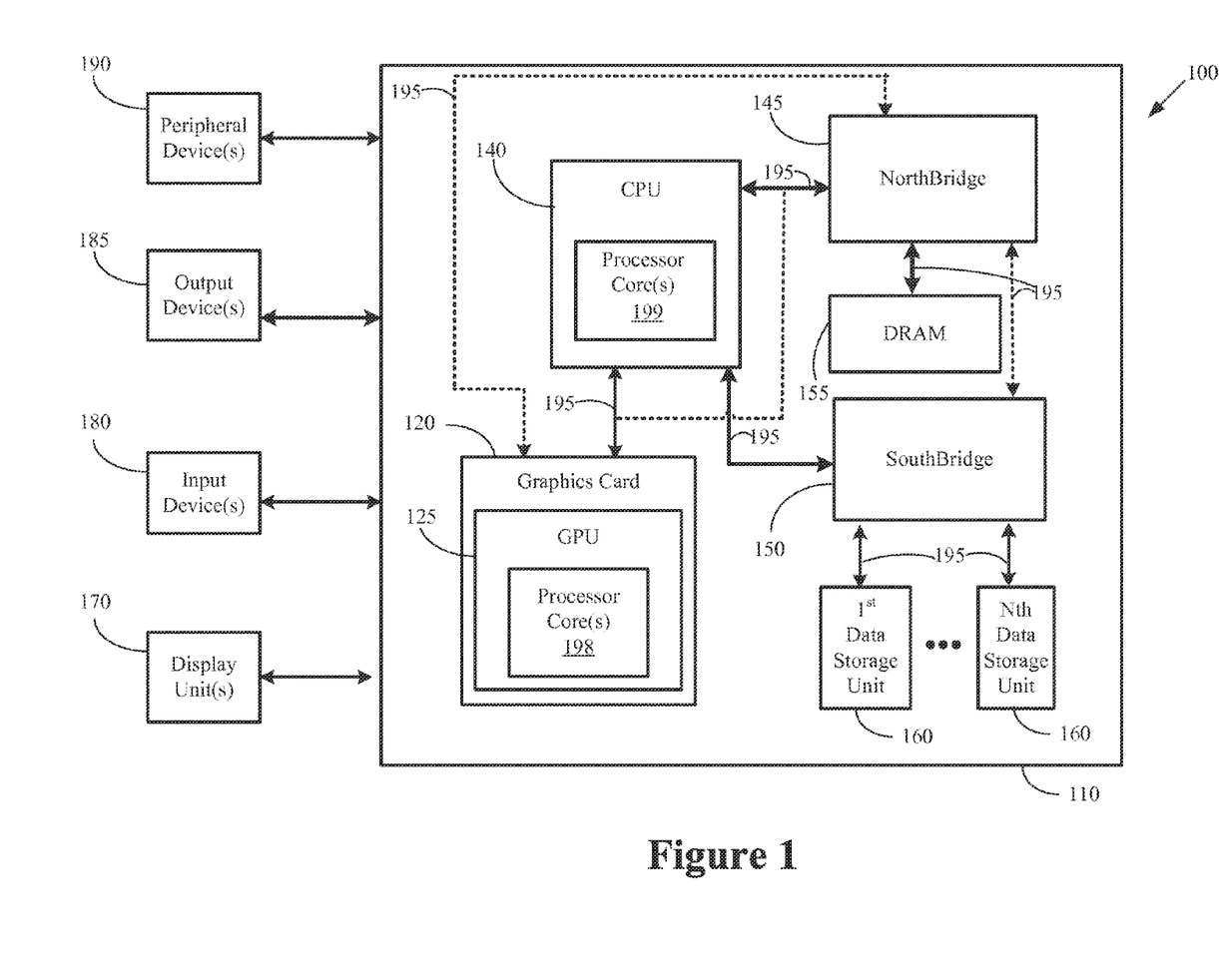
FIG. 1 illustrates an example computer system, according to some embodiments.

FIG. 1 illustrates an example computer system 100, according to some embodiments. The computer system 100 may be a personal computer, a computing-enabled television, a laptop computer, a handheld computer, a netbook computer, a mobile device, a tablet computer, a computing-enabled cellular telephone, a personal data assistant (PDA), a server, a mainframe, a work terminal, or the like. The computer system 100 includes a main structure 110 which may include a motherboard, system-on-a-chip, circuit board or printed circuit board, a desktop computer enclosure or tower, a laptop computer base, a server enclosure, part of a mobile device, tablet, personal data assistant (PDA), or the like.

Some embodiments of the main structure 110 include a graphics card 120, which may contain a graphics processing unit (CPU) 125 used in processing graphics data. The computer system 100 shown in FIG. 1 also includes a central processing unit (CPU) 140 or other type of processor, which is coupled to a northbridge 145. Some embodiments of the graphics card 120 may be coupled to the CPU 140 via the northbridge 145 or some other electromagnetic or communicative connection. The northbridge 145 may be coupled to a system RAM 155 (e.g., DRAM) and in some embodiments the system RAM 155 may be coupled directly to the CPU 140. The system RAM 155 may be of any RAM type known in the art and the type of RAM 155 may be a matter of design choice. In some embodiments, the northbridge 145 may be connected to a southbridge 150, which may be connected to one or more data storage units 160. In one or more embodiments, the various components of the computer system 100 may be operatively, electromagnetically, or physically connected or linked with a bus 195 or more than one bus 195. Some embodiments of the computer system 100 may be connected to one or more display units 170, input devices 180, output devices 185, or peripheral devices 190.

The GPU 125 and the CPU 140 shown in FIG. 1 may implement one or more processor cores 198, 199, respectively, for executing instructions. Some embodiments of the GPU 125 or the CPU 140 may implement four or more processor cores 198, 199 for processing four or more instructions in parallel. However, persons of ordinary skill in the art having benefit of the present disclosure should appreciate that the number of processor cores implemented in the GPU 125 or the CPU 140 is a mat er of design choice. The processor cores 198, 199 implement instruction pipelines that include one or more multi-cycle pipelines throne or more single-cycle pipelines. Single-cycle instruction can be allocated to one of the single-cycle pipelines that picks single-cycle instructions for execution in program order. The source registers of the single-cycle instruction can then be marked as ready for execution in the single-cycle pipeline in response to all older single-cycle instructions allocated to the single-cycle pipeline being ready and eligible to be picked for execution. Some embodiments of single-cycle instructions may reference some source registers that depend on multi-cycle instructions and some source registers that depend on single-cycle instructions. In that case, only the source registers that depend on single-cycle instructions may be marked as ready for execution in response to the older single-cycle instructions being picked for execution.

Figure 2:
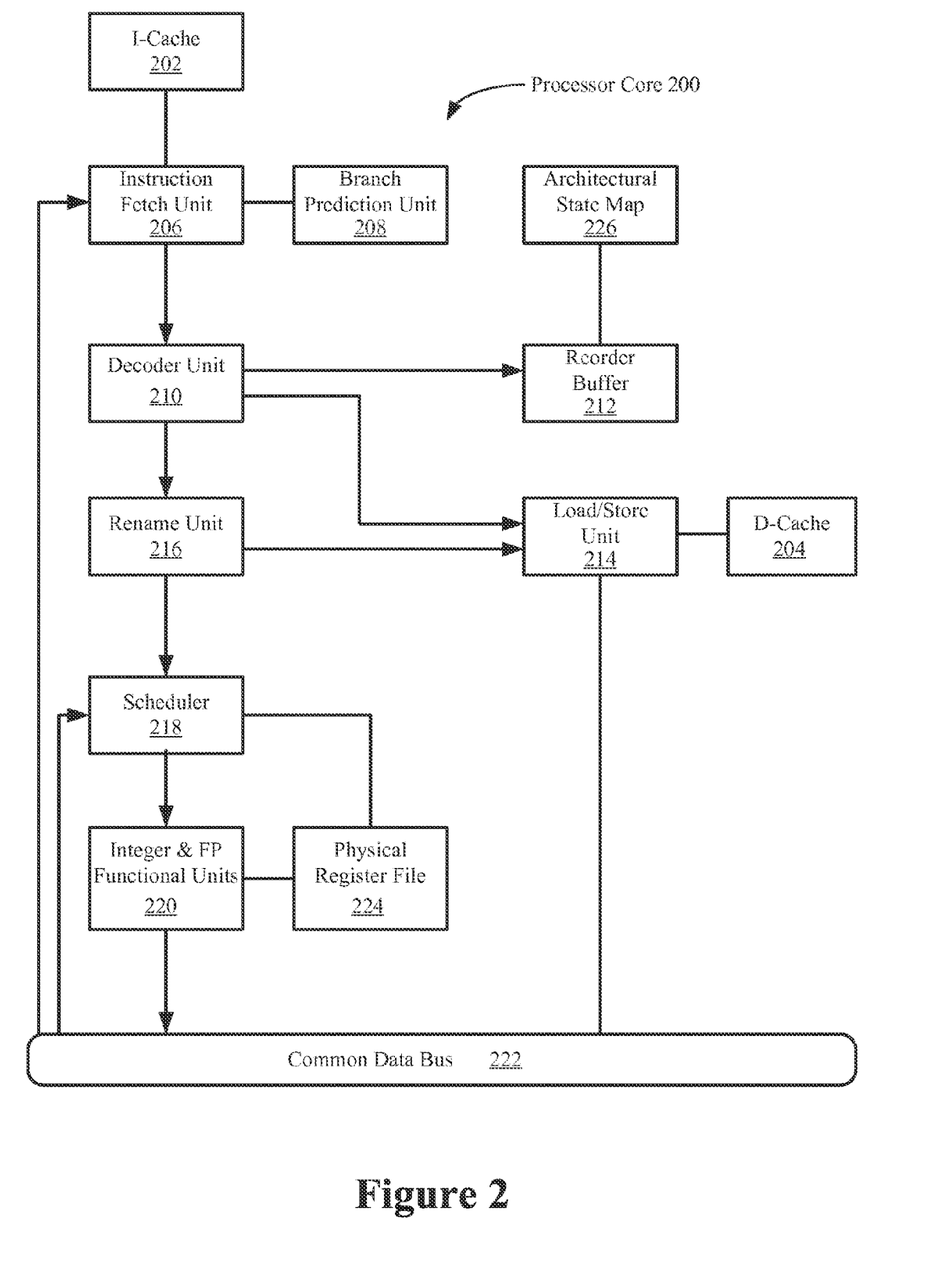
FIG. 2 illustrates an example processor core of the computer system of FIG. 1, according to some embodiments.

FIG. 2 illustrates an example of a processor core 200 that may be used to implement processor cores 198, 199 shown in FIG. 1, according to some embodiments. Processor core 200 may include circuitry for executing instructions according to a predefined instruction set. The processor core 200 may be implemented in a single-processor configuration or in a multi-processor configuration. Some embodiments of the processor core 200 may be included in a multi-core configuration within a processing node of a multi-node system.

An instruction-cache (I-cache) 202 may store instructions for a software application and a data-cache (D-cache) 204 may store data used in computations performed by the instructions. In some instances, the I-cache 202 and the D-cache 204 may be implemented together as a unified cache or as a hierarchy of caches such as L1 and L2 cache structures. Techniques for implementing and operating caches are known in the art and in the interest of clarity only those aspects of implementing or operating caches that are relevant to the claimed subject matter are discussed herein.

The processor core 200 includes an instruction fetch unit (IFU) 206 for fetching one or more instructions from the I-cache 202 per clock cycle. The IFU 206 may include a program counter (PC) register that holds a pointer to an address of the next instructions to fetch from the I-cache 202. A branch prediction unit 208 may be coupled to the IFU 206 and the branch prediction unit 208 may be configured to predict results of instructions that change the flow of an instruction stream from executing a next sequential instruction, e.g., branch instructions.

A decoder unit 210 implemented in the processor core 200 decodes the opcodes of the fetched instructions. The decoder unit 210 may also be able to determine whether the fetched instructions require one cycle or two or more cycles of latency in an instruction pipeline. For example, the decoder unit 210 may include a table that maps different opcodes to a latency value for the opcode. Some embodiments of the decoder unit 210 may divide a single instruction into two or more micro-operations (micro-ops). The micro-ops may be processed by subsequent pipeline stages and executed in program order or out-of-order. However, the micro-ops may not be committed until each micro-op corresponding to an original instruction is ready. As used herein, a reference to the processing of an "instruction" in core 200 may refer to the processing of the instruction as whole or refer to the processing of an individual micro-op comprised within the instruction. The decoder unit 210 may allocate entries in an in-order retirement queue, such as reorder buffer 212, in reservation stations, or in a load/store unit 214. In the example shown, a reservation station may comprise the rename unit 216 and the scheduler 218, which are shown as separate units. The flow of instructions from the decoder unit 210 to the allocation of entries in the rename unit 216 may be referred to as the dispatch of instructions. The rename unit 216 may be configured to perform register renaming for the fetched instructions.

Register renaming may facilitate the elimination of certain dependencies between instructions (e.g., write-after-read or "false" dependencies), which may in turn prevent unnecessary serialization of instruction execution. In some embodiments, rename unit 216 may be configured to rename the logical (e.g., architectural) destination registers specified by instructions by mapping them to a physical register space, resolving false dependencies in the process. In some embodiments, rename unit 216 may maintain mapping tables that reflect the relationship between logical registers and the physical registers to which they are mapped.

Once decoded and renamed, instructions may be ready to be scheduled for execution. The scheduler 218 may act as an instruction queue where instructions are stored in entries and wait until their operands become available in the corresponding source registers. When operands are available and hardware resources are also available, an instruction may be issued from the scheduler 218 to the integer and floating-point functional units 220 or the load/store unit 214. The functional units 220 may include arithmetic logic units (ALUs) for computational calculations such as addition, subtraction, multiplication, division, and square root. Logic may be included to determine an outcome of a branch instruction and to compare the calculated outcome with the predicted value. If there is not a match, a misprediction occurred, and the subsequent instructions after the branch instruction need to be removed and a new fetch with the correct PC value needs to be performed.

Results from the functional units 220 or the load/store unit 214 may be presented on a common data bus 222. The results may be sent to the reorder buffer 212 where the instruction receives its results and may be marked for retirement. Instructions at the head-of-the-queue may have their results written to the appropriate physical registers in a physical register file 224. The processor core 200 may also include an architectural state map 226 that maps the logical or architectural register numbers to the associated physical register numbers that indicate the physical registers in the physical register file 224. The architectural state of the general-purpose registers of processor core 200 may therefore be represented by the architectural state map 226 and the contents of the physical register file 224. Instructions in the reorder buffer 212 may be retired in-order and the head-of-queue pointer may be adjusted to the subsequent instruction in program order as each instruction is retired.

Some embodiments of the functional units 220 may implement pipelined execution of instructions. For example, a floating-point functional unit 220 may implement four pipelines for executing floating-point instructions (see, e.g., the description of FIG. 4 below). The pipelines may include a first stage for determining whether an instruction is ready and eligible to be scheduled for execution. As used herein, the term "ready", when referring to an instruction, indicates that the one or more source registers of the instruction are available for access by the instruction and are not waiting for another instruction to access the one or more of these registers. The term "eligible", when referring to an instruction, indicates that there are no identified pipeline hazards associated with the instruction. A second stage may be used to pick an instruction for execution, e.g., by choosing the oldest ready and eligible instruction in the pipeline. A third stage pre-decodes the instruction so that it is ready to read the source registers. One or more of the pipelines in the floating-point functional units 220 has a multi-cycle latency and one or more of the pipelines can support one-cycle latency. As used herein, the term "multi-cycle latency" indicates that two or more cycles are used to pick an instruction and then broadcast identifiers of the destination register for the picked instruction to other entries in the scheduler. As used herein, the term "single-cycle latency" indicates that a single cycle is used to pick the instruction and broadcast the destination register information.

Figure 3:
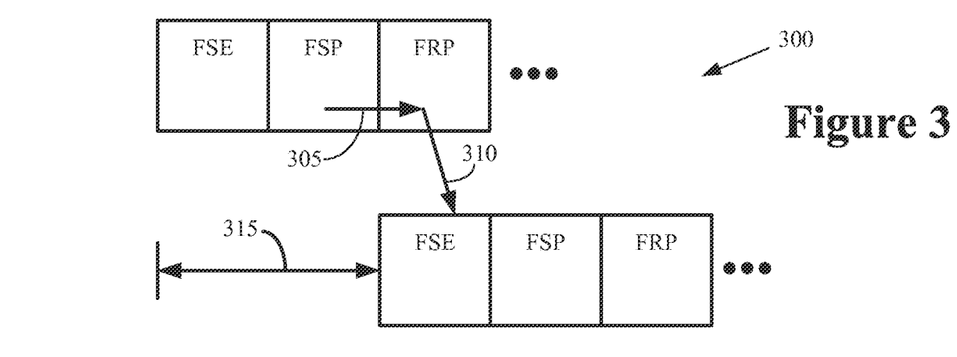
FIG. 3 illustrates a multi-cycle pipeline, according to some embodiments.

FIG. 3 illustrates a multi-cycle pipeline 300, according to some embodiments. Time increases from left to right in FIG. 3 and can be measured in cycles or seconds. Embodiments of the multi-cycle pipeline 300 may process instructions out of program order. The multi-cycle pipeline 300 may be implemented in an integer unit or a floating-point unit such as one of the integer or floating-point units 220 shown in FIG. 2. The stages of the multi-cycle pipeline 300 include a floating-point schedule-eligible stage (FSE) for determining whether the source registers of the instructions in the scheduler queue are ready and eligible, a floating-point scheduler pick stage (FSP) for picking the oldest ready and eligible instruction for each pipeline, and a floating-point register pre-decode stage (FRP) that is used to prepare to read the source data registers. The multi-cycle pipeline 300 may also include additional stages, which are omitted from FIG. 3 in the interest of clarity. Each of the stages of the multi-cycle pipeline 300 is required to complete in one cycle.

Information identifying the picked instruction can be forwarded from the FSP stage to the FRP stage, as indicated by arrow 305. Identities of the destination registers of the instruction such as a physical register number or architectural register number may then be broadcast during the FRP stage, as indicated by the arrow 310, and used to determine whether other instructions in the scheduler queue have become ready and eligible to be picked for execution. For example, a scheduler such as the scheduler 218 shown in FIG. 2 may use a matching algorithm to determine whether the broadcast destination registers are the same as source registers of one or more dependent instructions in the scheduler queue. Once the identities of all the source registers of a dependent instruction have been broadcast, the instruction may be marked as ready and eligible to be picked for execution. In this example, the process of broadcasting the identities of the destination registers of picked instructions and updating the list of ready and eligible instructions in the FSE stage consumes at least two cycles in the multi-cycle pipeline 300 and so the multi-cycle pipeline 300 has a two-cycle latency 315.

Figure 4:
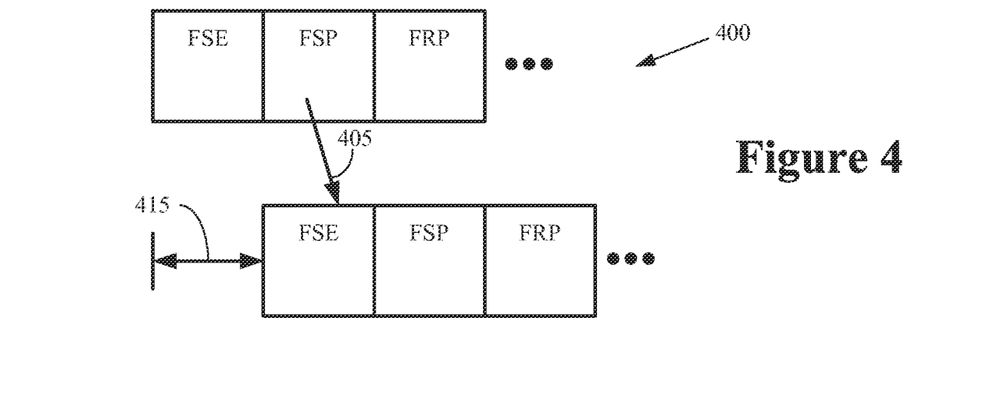
FIG. 4 illustrates a single-cycle pipeline, according to some embodiments

FIG. 4 illustrates a single-cycle pipeline 400, according to some embodiments. Time increases from left to right in FIG. 4 and can be measured in cycles or other units such as seconds. Embodiments of the single-cycle pipeline 400 may process single-cycle instructions in program order. The single-cycle pipeline 400 may be implemented in a floating-point unit such as one of the floating-point units 220 shown in FIG. 2. The stages of the single-cycle pipeline 400 include a floating-point schedule eligible stage (FSE) for determining whether the source registers of the instructions in the scheduler queue are ready and eligible to be picked for execution, a floating-point scheduler pick stage (FSP) for picking the oldest ready and eligible instruction for each pipeline, and a floating-point register pre-decode stage (FRP) that is used to prepare to read the source data registers. The single-cycle pipeline 400 may also include additional stages that are not depicted in FIG. 4 in the interest of clarity. In this example, each of the stages of the single-cycle pipeline 400 is required to complete in one cycle.

Single-cycle instructions may be assigned to the single-cycle pipeline 400 when they are dependent upon one or more older single-cycle instructions that have been assigned to the single-cycle pipeline 400. Information identifying older instructions that have been marked ready and eligible to be picked for execution by the pipeline 400 may be conveyed to other instructions in the scheduler during the FSP stage of the single-cycle pipeline 400, as indicated by the arrow 405. Source registers for single-cycle instructions in the scheduler queue that depend upon older single-cycle instructions may be marked as ready for execution in the single-cycle pipeline 400 when all older single-cycle instructions in the single-cycle pipeline 400 have been marked as ready and eligible for execution. Consequently, the scheduler can mark these source registers as ready before receiving the results of the matching algorithm that may be applied to the broadcast destination registers, as discussed herein with regard to the multi-cycle pipeline 300. Some embodiments of the scheduler may therefore bypass performing the matching algorithm for some dependent single-cycle instructions. In this example, the process of marking dependent instructions as ready to be picked for execution and updating the list of ready and eligible instructions in the FSE stage consumes a single cycle and so the single-cycle pipeline 400 has a single-cycle latency 415.

Figure 5:
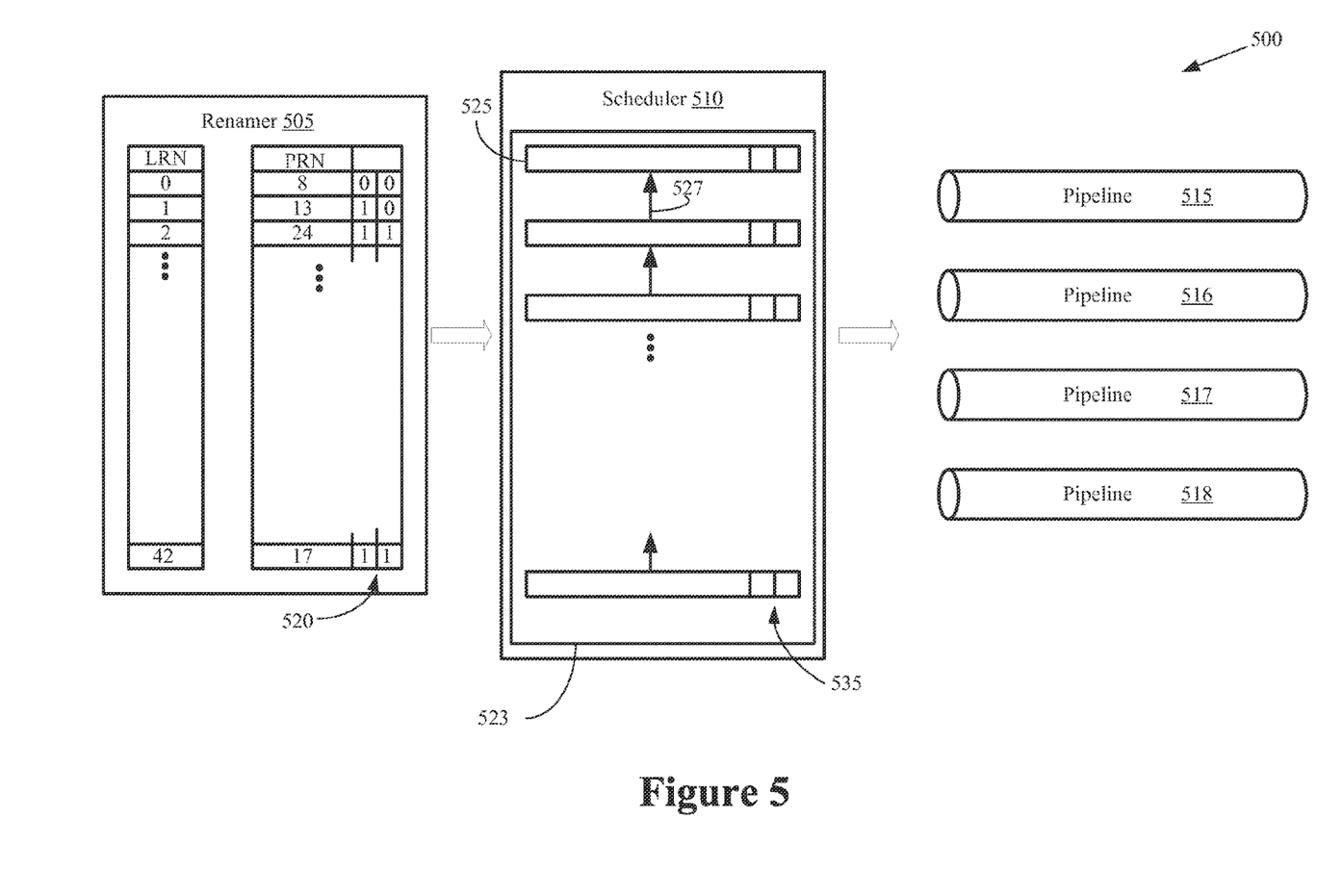
FIG. 5 illustrates a portion of a processor core that may be used to implement the processor core of FIG. 2, according to some embodiments.

FIG. 5 illustrates a portion of a processor core 500 that may be used to implement processor core 200 shown in FIG. 2, according to some embodiments. The processor core 500 includes a renamer 505 (an example of the rename unit 216), a scheduler 510 (an example of the scheduler 218), and four pipelines 515, 516, 517, and 518 (collectively referred to herein as "pipelines 515-518"). The pipelines 515 and 518 are configured to support multi-cycle instructions. For example, the pipelines 515 and 518 may be implemented using embodiments of the multi-cycle pipeline 300 shown in FIG. 3. The pipelines 516 and 517 are configured to support either single cycle or multi-cycle instructions. For example, the pipelines 516 and 517 may be implemented using embodiments of the single-cycle pipeline 400 shown in FIG. 4. Persons of ordinary skill in the art having benefit of the present disclosure should appreciate that the total number of pipelines 515-518, as well as the number of pipelines 515-518 in the subsets that are configured for multi-cycle or single cycle-operation, may differ from those described in this example.

Renamer 505 may be used to store a mapping between an architectural or logical register number (LRN) and a physical register number (PRN) of a physical register used to hold information associated with the logical register. The renamer 505 also includes status information for the register numbers, in the form of, for example, status bits 520 associated with each LRN or PRN. The status bits 520 are used to indicate whether a decoder, such as the decoder unit 210 shown in FIG. 2, has determined that the instruction is a multi-cycle instruction or a single-cycle instruction. The status bits 520 may also be used to indicate the one of the pipelines 515-518 that has been allocated for processing of the instruction that references the corresponding LRN and may therefore read or write information in the associated PRN. For example, the first bit in the set of status bits 520 may be used to indicate whether the instruction is a single-cycle or multi-cycle instruction. A value of 0 indicates that the instruction is a multi-cycle instruction and a value of 1 indicates that the instruction is a single-cycle instruction. The second bit in the set of status bits 520 may be used to indicate the one of the pipelines 515-518 used to process the instruction. A value of 0 in the second bit indicates that the pipeline 516 is used to process the instruction and a value of 1 in the second bit indicates that the pipeline 517 is used to process the single-cycle instruction. Thus, a set of status bits 520 that has the value "00" indicates that the instruction is a multi-cycle instruction that may be assigned to either of the pipelines 515 or 518. A set of status bits 520 that has the value "10" indicates that the instruction is a single-cycle instruction that is assigned to the pipeline 516 and a set of status bits 520 that has the value "11" indicates that the instruction is a single-cycle instruction that is assigned to the pipeline 517.

The scheduler 510 includes a queue 523 of entries 525 for instructions that can be scheduled for execution in one of the pipelines 515-518. Each entry includes information 530 associated with the instruction such as an opcode, a destination register, one or more source registers, and one or more source register ready bits that are used to indicate that the corresponding source register is ready, e.g., the source register is not waiting for an older instruction to write information to the source register. The entries 525 in queue 523 are listed in program order. For example, the entries 525 are listed in program order so that the ages of the instructions increase from top to bottom of the queue 523. The youngest instructions are in the entries 525 at the top of the queue 523 shown in FIG. 5 and the oldest entries are at the bottom of illustrated queue 523. Persons of ordinary skill in the art having benefit of the present disclosure should appreciate that the age-ordering of the entries 525 may be indicated by the physical location of the entries 525 or using other techniques such as pointers that link the entries 525 in program order. For example, pointers 527 may be used to point from an entry 525 to the next youngest entry 525.

Entries 525 in the queue 523 also include a set of status bits 535 that may be used to indicate whether the data in the source registers is (or will be) provided by another single-cycle instruction in one of the available pipelines 515. In the interest of clarity, FIG. 5 illustrates only one set of such status bits. The scheduler 510 may use this information to determine whether the instruction in an entry 525 is dependent upon an older single-cycle instruction in one of the available pipelines 515-518. If so, the scheduler 510 may schedule the dependent instruction to the same pipeline as the older single-cycle instruction. Otherwise, the scheduler 510 may schedule the instruction to a different pipeline 515-518, as discussed herein. Some embodiments of the entries 525 may include source registers that are dependent on single-cycle instructions and other source registers that are dependent on multi-cycle instructions. These entries 525 may also be scheduled to the same pipeline as an older single-cycle instruction if one or more of the source registers of the entry 525 depends on the older single-cycle instruction.

Some embodiments of the scheduler 510 implement a broadcast/matching algorithm to schedule multi-cycle instructions. For example, information identifying the destination registers of picked instructions may be broadcast and then compared to information identifying source registers in the entries 525. When a destination register matches a source register, the source register is marked as ready. When all of the source registers in an entry 525 are marked ready, the instruction associated with the entry 525 is marked as ready for execution. The instruction in the entry 525 becomes eligible for execution when all hazards in the corresponding pipeline have been cleared. Some embodiments of the scheduler 510 can bypass the broadcast/matching algorithm when scheduling single-cycle instructions. For example, the scheduler 510 can mark one or more source registers of an entry 525 for a single-cycle instruction as ready when the one or more source registers depend on results of a single-cycle instruction and all the older single-cycle instructions in the scheduler 510 on the same pipeline are ready and eligible. Since the scheduler 510 schedules the single-cycle instructions in program order, the older (ready and eligible) single-cycle instructions will have written to the source registers before any younger (and potentially dependent) single-cycle instruction accesses this data. Consequently, the source registers of the younger single-cycle instruction may be marked ready for execution earlier than they would have been marked ready if the younger single-cycle instruction had waited to receive broadcast values of the destination registers and perform the register comparison to determine which of its source registers were ready. As discussed herein, the time savings may allow the single-cycle instructions to be processed with only one cycle of latency.

The scheduler 510 may pick the multi-cycle instructions for the pipelines 515 and 518 out of program order. Multi-cycle instructions may therefore be assigned to the pipelines 515 and 518. Single-cycle instructions may also be assigned to the pipelines 515 and 518 but in this case they may be picked out of order with two or more cycles of latency. Moreover, instructions that have dependencies with instructions in other pipelines may be picked and executed out-of-order with two or more cycles of latency. Some embodiments of the scheduler 510 may also pick single-cycle instructions for any of the pipelines out of order with two or more cycles of latency if at least one older single-cycle instruction is not ready or eligible in the pipeline 515 used for the younger single-cycle instruction.

Figure 6:
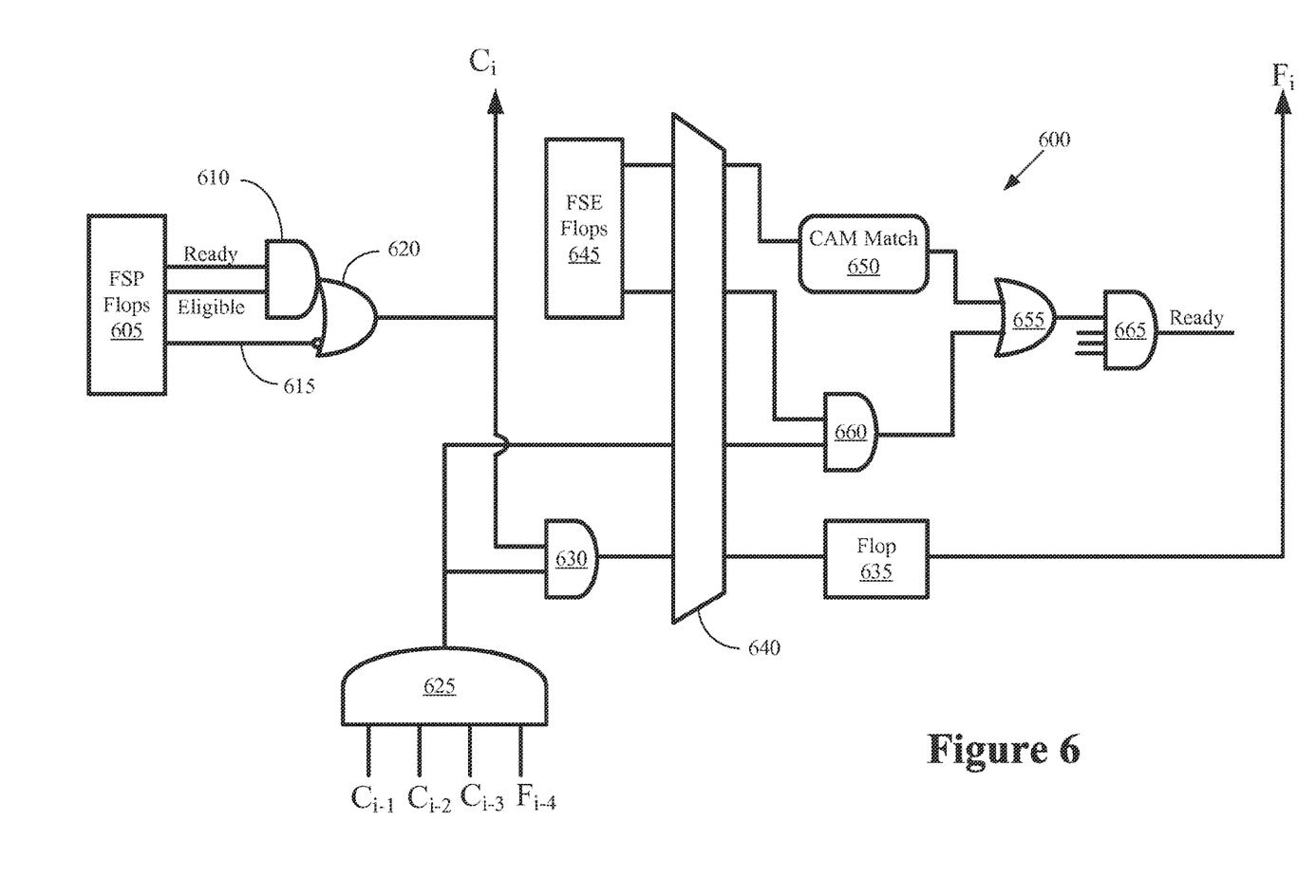
FIG. 6 illustrates an example entry of an instruction scheduler of the processor core of FIG. 5, according to some embodiments.

FIG. 6 illustrates an example of an entry 600, such as the entries 525 in the scheduler 510 shown in FIG. 5, according to some embodiments. The entry 600 includes a set of flip-flops (FSP Flops) 605 that include information indicating the state of the FSP stage of the pipeline, e.g., as shown in the pipelines 300, 520 in FIGS. 3 and 5. For example, the FSP flops 605 include information indicating whether the instruction in the entry 600 is ready and/or eligible. This information can be provided to an AND gate 610, which provides an output indicating whether the entry is both ready and eligible. The FSP flops 605 also include information indicating whether the instruction in the entry 600 has been allocated to a single-cycle pipeline. This information can be used to provide a signal 615 to an inverted input of an OR gate 620, which also receives the output of the AND gate 610 as an input. The output $C_i$ of the OR gate 620 therefore indicates whether the instruction in the entry 600 is "not a single-cycle instruction" or is "ready and eligible." The output $C_i$ is provided or broadcast to younger entries. Thus, the younger entries can use the output $C_i$ to determine whether the older entry 600 contains an older single-cycle instruction that is ready and eligible.

Entry 600 also includes an AND gate 625 that receives inputs from older entries indicating whether the older entries are ready and eligible. The inputs shown in FIG. 6 include three inputs generated during the current cycle ($C_{i-1}$, $C_{i-2}$, $C_{i-3}$) that indicate whether the next three older entries in the scheduler queue are "not a single-cycle instruction" or "ready and eligible." The AND gate 625 also receives an input ($F_{i-4}$) from a flop that indicates whether entries older than the next three older entries are "not a single-cycle instruction" or "ready and eligible." For example, if all of the entries that are older than the entry 600 are multi-cycle instructions or single-cycle instructions that are ready and eligible, all of the inputs may be set to high values and the output of the AND gate 625 may be set to a high value. The output of the AND gate 625 may be provided to another AND gate 630, where it is combined with the output of the OR gate 620. The output of the AND gate 630 may be provided to a flop 635 via a compaction multiplexer 640. For example, if the output of the AND gate 625 is high (indicating that all single-cycle entries older than the entry 600 are ready and eligible) and the output of the OR gate 620 is high (indicating that the entry 600 is a multi-cycle entry or a single-cycle entry that is ready and eligible), the value of the flop 635 may be set to a high-value. The value of the flop 635 may be read out by younger entries.

The entry 600 includes a set of flip-flops (FSE Flops) 645 that include information indicating the state of the FSE stage of the pipeline, e.g., as shown in the pipelines 300, 400 in FIGS. 3 and 4. This information includes information identifying source registers for the entry 600, which can be provided (via a compaction multiplexer 640) to CAM match logic 650 that uses a content-addressable memory (CAM) to compare (CAM match) broadcast identifiers of destination registers with identifiers of source registers for the entry 600. For example, the CAM match logic 650 can be used to match destination and source registers if the entry 600 includes an instruction that is being processed with multi-cycle latency. The CAM match logic 650 may then output a signal indicating whether the entry 600 is ready for scheduling and provide the signal to OR gate 655. The output of the AND gate 625 may be combined (at AND gate 660) with output from the FSE flops 645 and the result input to OR gate 655, which in turn outputs a signal, denoted "Ready," which indicates that the entry 600 is ready to be picked for execution. The entry 600 may therefore be marked as ready as a result of a successful CAM match of its source registers (e.g., for a multi-cycle instruction) or when all older single-cycle instructions are ready and eligible (e.g., for a single-cycle instruction). For example, the AND gate 665 may receive the information indicating the ready state of each source register and the output of the AND gate 665 may provide the Ready signal when all of the source registers are ready. The Ready signal may be used to set a ready bit that can be stored in the FSP flops 605.

Figure 7:
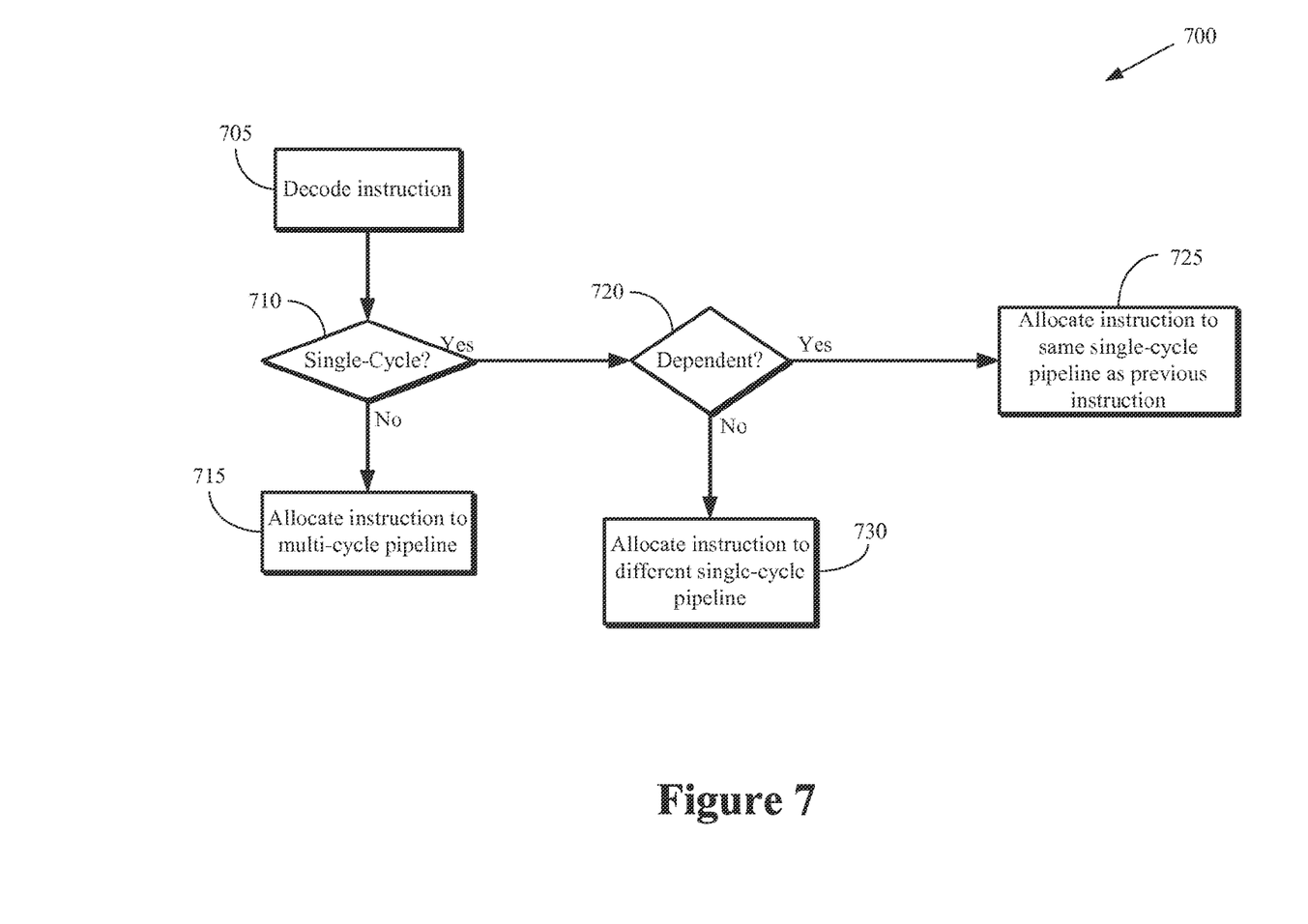
FIG. 7 illustrates an example method for allocating instructions to instruction pipelines with multi-cycle latency or single-cycle latency, according to some embodiments.

FIG. 7 illustrates an example of a method 700 for allocating instructions to pipelines with multi-cycle latency or single-cycle latency, according to some embodiments. At block 705, a decoder, such as the decoder unit 210 shown in FIG. 2, decodes an instruction. At block 710, the decoder determines whether the decoded instruction is a single-cycle instruction or a multi-cycle instruction. If the instruction is a multi-cycle instruction, at block 715 the scheduler allocates the instruction to a multi-cycle pipeline. The allocation of the instruction to the multi-cycle pipeline may be indicated using a set of status bits that can be provided to a renamer or a scheduler, as discussed herein. If the decoder determines at block 710 that the decoded instruction is a single-cycle instruction, a scheduler, such as the scheduler 218 shown in FIG. 2, determines, at block 720, whether the single-cycle instruction is dependent upon a previous (older) single-cycle instruction that was allocated to a pipeline that operates with single cycle latency. If so, at block 725 the single-cycle instruction may be allocated to the same pipeline as the previous single-cycle instruction. If not, at block 730 the single-cycle instruction may be allocated to a different pipeline from the previous single-cycle instruction. Pipeline switching in this manner may help to balance the load on the different pipelines.

Figure 8:
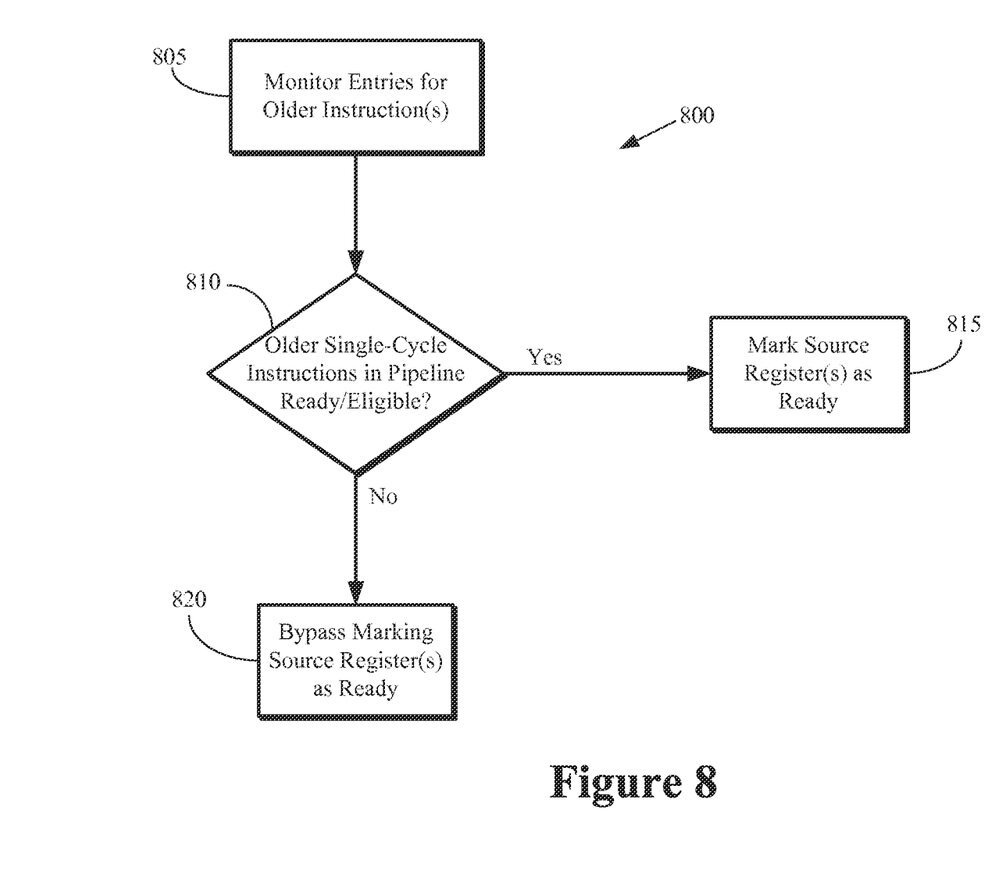
FIG. 8 illustrates an example method for determining whether single-cycle instructions are ready and eligible, according to some embodiments.

FIG. 8 illustrates an example of a method 800 for determining whether single-cycle instructions are ready, according to some embodiments. A scheduler, such as the scheduler 218 shown in FIG. 2, maintains a queue of entries for instructions waiting to be picked for execution. For each entry in the queue, at block 805 the scheduler monitors signals provided by the older entries in the queue to determine whether the older instructions are ready and eligible to be picked for execution. If, at block 810, the scheduler determines that all older single-cycle instructions in the pipeline allocated to the current (younger) instruction are ready and eligible to be picked, at block 815 the scheduler marks the source registers of the instruction as ready. Some embodiments of the instruction may include other source registers that are dependent upon multi-cycle instructions and the source registers may not be marked as ready until the results of a CAM match indicates that the relevant older multi-cycle instruction has written to the source register. As long as one or more older single-cycle instructions in the pipeline are not ready and eligible to be picked, at block 820 the scheduler bypasses marking the source registers of the instruction as ready.

In some embodiments, the apparatus and techniques described above are implemented in a system comprising one or more integrated circuit (IC) devices (also referred to as integrated circuit packages or microchips), such as the processor cores described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 9:
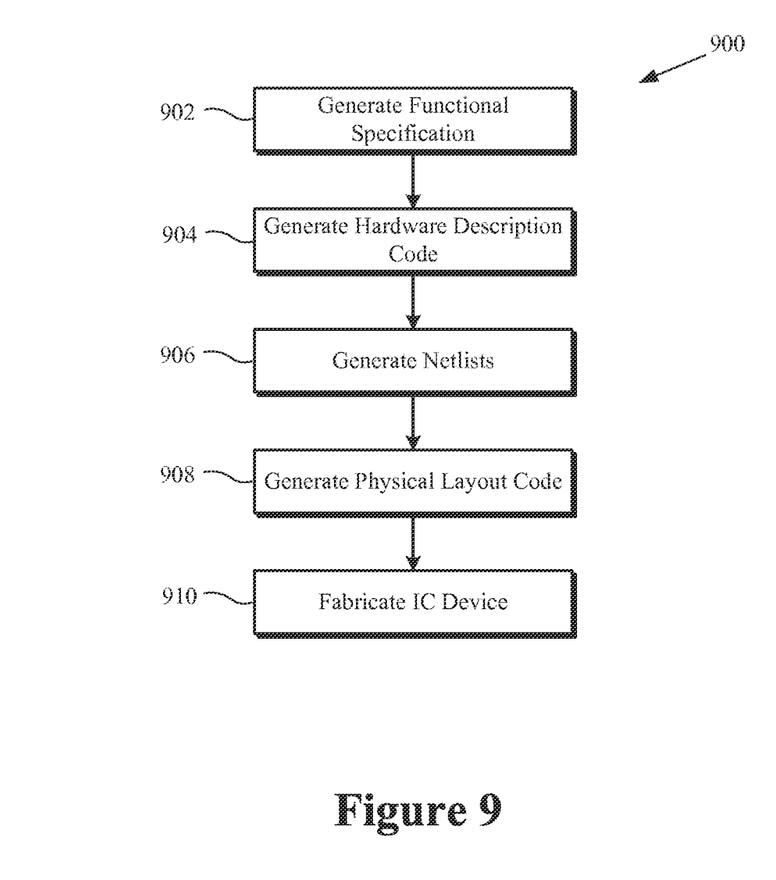
FIG. 9 is a flow diagram illustrating an example method for the design and fabrication of an IC device implementing one or more aspects, according to some embodiments.

FIG. 9 is a flow diagram illustrating an example method 900 for the design and fabrication of an IC device implementing one or more aspects, according to some embodiments. As noted above, the code generated for each of the following processes is stored or otherwise embodied in computer readable storage media for access and use by the corresponding design tool or fabrication tool.

At block 902 a functional specification for the IC device is generated. The functional specification (often referred to as a micro architecture specification (MAS)) may be represented by any of a variety of programming languages or modeling languages, including C, C++, SystemC, Simulink, or MATLAB.

At block 904, the functional specification is used to generate hardware description code representative of the hardware of the IC device. Some embodiments of the hardware description code are represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable medium) representing the components and connectivity of the circuit diagram. The captured circuit diagram may then be subjected to one or more rounds of simulation for testing and verification.

At block 908, one or more EDA tools use the netlists produced at block 806 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System (GDSII) format. Data in this format typically represents geometric shapes, text labels, and other information about the circuit layout in hierarchical form.

At block 910, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   allocating a first single-cycle instruction to a first pipeline that picks single-cycle instructions for execution in program order; and
   marking at least one source register of the first single-cycle instruction as ready for execution in the first pipeline in response to all older single-cycle instructions allocated to the first pipeline being ready and eligible to be picked for execution.

2. The method of claim 1, wherein allocating the first single-cycle instruction to the first pipeline comprises allocating the first single-cycle instruction to the first pipeline in response to the first single-cycle instruction being dependent upon at least one older single-cycle instruction previously allocated to the first pipeline.

3. The method of claim 2, further comprising:
   modifying values of bits in an entry in a renamer to indicate that the first single-cycle instruction is a single-cycle instruction and to identify the first single-cycle instruction as being allocated to the first pipeline.

4. The method of claim 3, further comprising:
   modifying values of bits in an entry in a scheduler to indicate that said at least one source register of the first single-cycle instruction is dependent on said at least one older single-cycle instruction.

5. The method of claim 1, wherein marking said at least one source register of the first single-cycle instructions as ready comprises marking said at least one source register of the first single-cycle instruction as ready prior to comparing broadcast information identifying one or more destination registers with said at least one source register of the first single-cycle instruction.

6. The method of claim 1, wherein marking said at least one source register of the first single-cycle instruction as ready comprises marking said at least one source register of the first single-cycle instruction as ready in response to a first predetermined number of older instructions became ready and eligible during a current cycle and a second predetermined number of older instructions became ready and eligible during a previous cycle.

7. The method of claim 1, further comprising:
   in response to a second single-cycle instruction being independent of any older single-cycle instruction in the first pipeline, allocating the second single-cycle instruction to a second pipeline that picks single-cycle instructions for execution in program order.

8. The method of claim 1, further comprising:
allocating at least one multi-cycle instruction to at least a third pipeline that picks instructions out-of-order for execution.

9. An apparatus, comprising:
a decoder to decode a first single-cycle instruction and allocate the first single-cycle instruction to a first pipeline; and
a scheduler to pick single-cycle instructions for execution by the first pipeline in program order and to mark at least one source register of the first single-cycle instruction as ready for execution in the first pipeline in response to all older single-cycle instructions allocated to the first pipeline are ready and eligible.

10. The apparatus of claim 9, wherein the decoder is to determine whether said at least one source register of the first single-cycle instruction is dependent upon at least one older single-cycle instruction in the first pipeline and to allocate the first single-cycle instruction to the first pipeline in response to said at least one source register of the first single-cycle instruction being dependent upon said at least one older single-cycle instruction.

11. The apparatus of claim 10, further comprising:
a renamer, wherein the decoder provides status information to an entry in the renamer to indicate that the first single-cycle instruction is a single-cycle instruction and to identify the first pipeline.

12. The apparatus of claim 10, wherein the decoder is to provide status information to an entry in the scheduler to indicate that said at least one source register of the first single-cycle instruction is dependent on said at least one older single-cycle instruction.

13. The apparatus of claim 9, wherein the scheduler is to mark said at least one source register of the first single-cycle instruction as ready prior to comparing broadcast information identifying one or more destination registers with said at least one source register of the first single-cycle instruction.

14. The apparatus of claim 9, wherein the scheduler is to mark said at least one source register of the first single-cycle instruction as ready in response to a first predetermined number of older instructions becoming ready and eligible during a current cycle and a second predetermined number of older instructions becoming ready and eligible during a previous cycle.

15. The apparatus of claim 9, wherein the decoder is to allocate a second single-cycle instruction to a second pipeline in response to the second single-cycle instruction being independent of any older single-cycle instructions in the first pipeline, wherein the scheduler picks single-cycle instructions for execution by the second pipeline in program order.

16. The apparatus of claim 9, wherein the decoder is to allocate at least one multi-cycle instruction to at least one third pipeline, wherein the scheduler is to pick instructions out-of-order for execution by said at least one third pipeline.

17. A computer readable medium storing code to adapt at least one computer system to perform a portion of a process to fabricate at least part of a processor comprising:
a decoder to decode a first single-cycle instruction and allocate the first single-cycle instruction to a first pipeline; and
a scheduler to pick single-cycle instructions for execution by the first pipeline in program order and to mark at least one source register of the first single-cycle instruction as ready for execution in the first pipeline in response to all older single-cycle instructions allocated to the first pipeline are ready and eligible.

18. The non-transitory computer readable medium set forth in claim 17, wherein the processor further comprises a renamer, and wherein the decoder writes values of bits to an entry in the renamer to indicate that the first single-cycle instruction is a single-cycle instruction and to identify the first pipeline.

19. The non-transitory computer readable medium set forth in claim 17, wherein the processor further comprises at least one third pipeline, wherein the decoder is to allocate at least one multi-cycle instruction to said at least one third pipeline.

20. The non-transitory computer readable medium set forth in claim 19, wherein the scheduler picks instructions out-of-order for execution by said at least one third pipeline.

* * * * *

UNITED STATES PATENT AND TRADEMARK OFFICE
CERTIFICATE OF CORRECTION

| | | |
|---|---|---|
| PATENT NO. | : 9,959,122 B2 | Page 1 of 1 |
| APPLICATION NO. | : 13/869488 | |
| DATED | : May 1, 2018 | |
| INVENTOR(S) | : Michael D. Estlick et al. | |

It is certified that error appears in the above-identified patent and that said Letters Patent is hereby corrected as shown below:

On the Title Page

Item (54) Line 1, please correct "Single Cycle Instruction" to be --Single-Cycle Instruction--

In the Claims

At Column 16 Line 16, please correct "A computer readable" to be --A non-transitory computer readable--

Signed and Sealed this
Tenth Day of December, 2019

Andrei Iancu
*Director of the United States Patent and Trademark Office*